United States Patent [19]

Civardi et al.

[11] 3,931,437

[45] *Jan. 6, 1976

[54] SURFACE TREATMENT OF MICROPOROUS MATERIAL

[75] Inventors: Frank Peter Civardi, Wayne; Hans Georg Kuenstler, Clifton, both of N.J.

[73] Assignee: Inmont Corporation, New York, N.Y.

[ * ] Notice: The portion of the term of this patent subsequent to Oct. 9, 1990, has been disclaimed.

[22] Filed: Sept. 27, 1973

[21] Appl. No.: 401,480

Related U.S. Application Data

[63] Continuation of Ser. No. 56,936, July 21, 1970, Pat. No. 3,764,363, and a continuation-in-part of Ser. Nos. 843,425, July 22, 1969, abandoned, and Ser. No. 867,762, Oct. 20, 1969, abandoned.

[52] U.S. Cl. ............... 427/246; 427/278; 427/322; 427/336; 427/378
[51] Int. Cl.² ... B05D 5/00; B05D 3/12; B05D 3/10; B05D 3/04
[58] Field of Search ......... 117/10, 11, 47 A, 63, 64; 427/246, 278, 336

[56] References Cited
UNITED STATES PATENTS

| | | | |
|---|---|---|---|
| 2,348,165 | 5/1944 | Buchanan | 117/163 X |
| 3,067,483 | 12/1962 | Hollowell | 117/140 A |
| 3,100,721 | 8/1963 | Holden | 117/135.5 |
| 3,157,723 | 11/1964 | Hochberg | 264/314 X |
| 3,202,527 | 11/1965 | Stephens | 117/45 |
| 3,284,274 | 11/1966 | Hulslander et al. | 161/159 |
| 3,429,727 | 2/1969 | Hochberg | 117/11 |
| 3,481,766 | 12/1969 | Craven et al. | 117/11 |
| 3,481,767 | 12/1969 | Craven et al. | 117/11 |
| 3,483,015 | 12/1969 | Fukushima et al. | 117/135.5 X |
| 3,496,000 | 2/1970 | Hull et al. | 117/135.5 |
| 3,501,326 | 3/1970 | Hochberg et al. | 117/135.5 |
| 3,510,344 | 5/1970 | Dunderdale | 117/135.5 X |
| 3,515,573 | 6/1970 | Japs et al. | 117/135.5 X |
| 3,536,553 | 10/1970 | Farrell et al. | 117/47 A |
| 3,671,375 | 6/1972 | Buskirk | 161/159 |
| 3,687,715 | 8/1972 | Kijane et al. | 161/159 |

*Primary Examiner*—William D. Martin
*Assistant Examiner*—Evan Lawrence

[57] ABSTRACT

A sheet material having a microporous surface of elastomeric polyurethane is treated to produce a sheet, which has greater water-proofness and still transmits water vapor, by applying to it a coagulated layer of elastomeric polyurethane. Preferably the coagulated layer is produced by applying a pigmented polyurethane solution to the sheet while it is wet with a nonsolvent. The coagulated layer may then be treated in various ways; e.g. it may be embossed or treated with a solvent to form a fused glossy moisture vapor-transmitting surface. The product is suitable for use as a leather substitute in shoe uppers.

12 Claims, 8 Drawing Figures

20 MICRONS

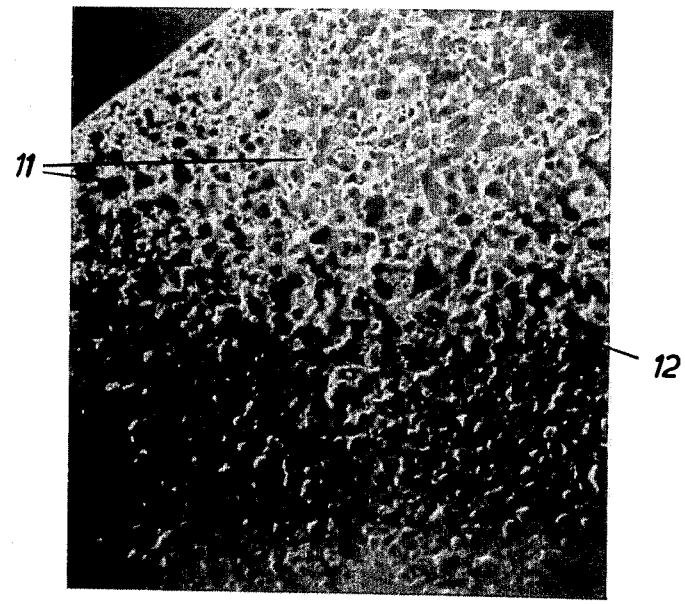
FIG. 1.  ⊢———⊣ 200 MICRONS
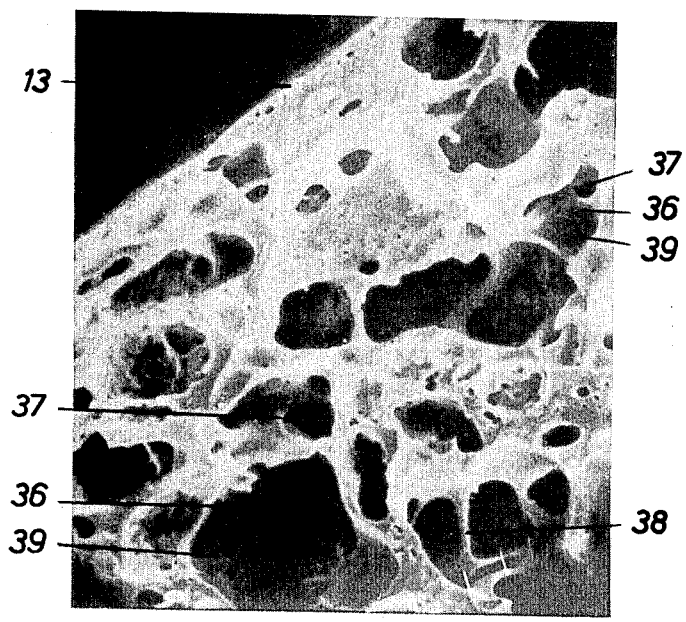
FIG. 2.  ⊢———⊣ 20 MICRONS

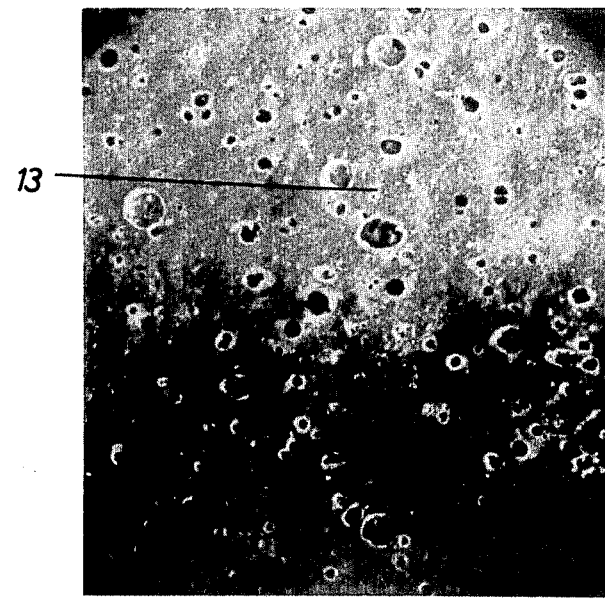
FIG. 3.  |—————| 60 MICRONS
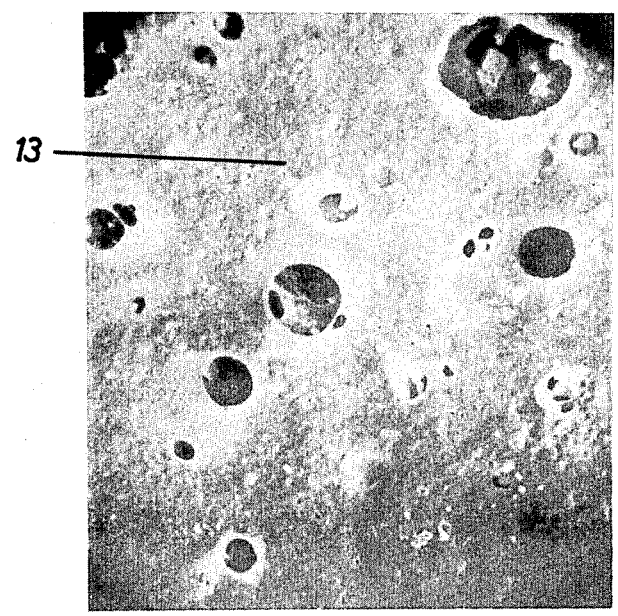
FIG. 4.  |—————| 20 MICRONS

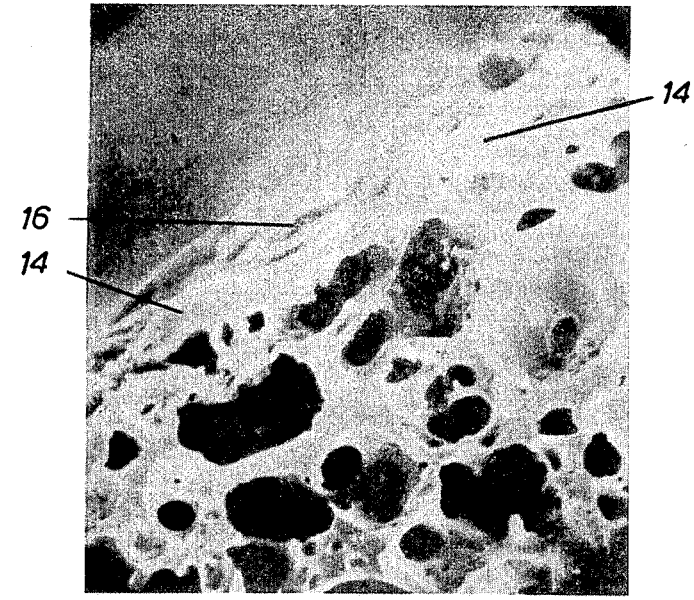
FIG. 5.  20 MICRONS
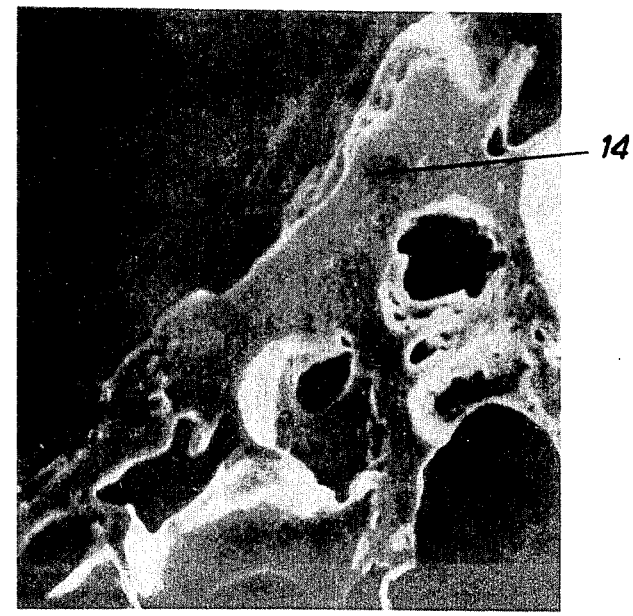
FIG. 6.  10 MICRONS

U.S. Patent    Jan. 6, 1976    Sheet 4 of 4    3,931,437
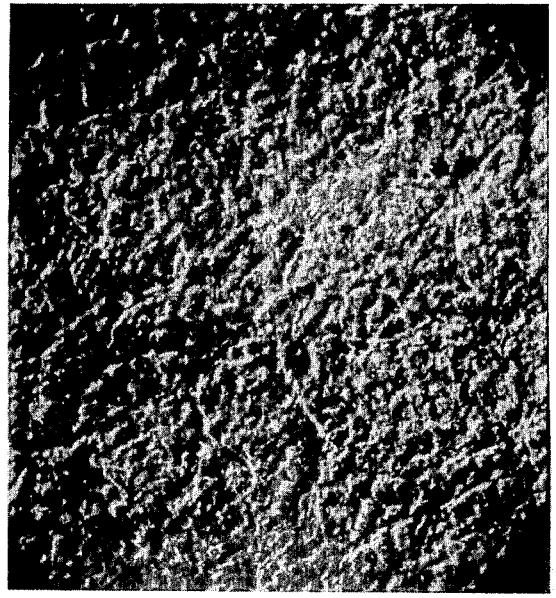
FIG. 7.    ⊢──────⊣ 200 MICRONS
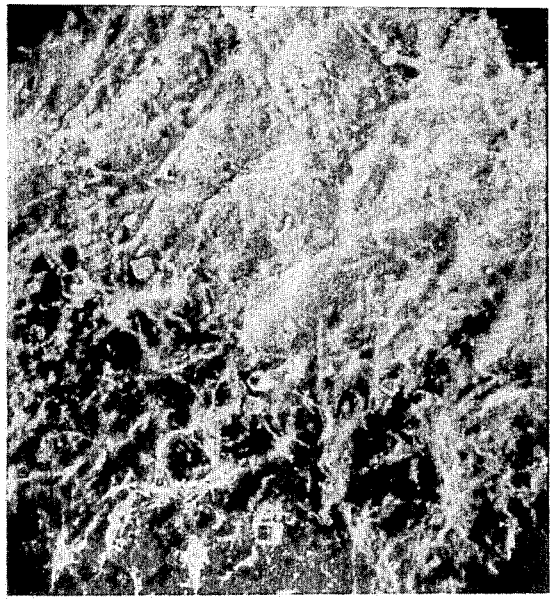
FIG. 8.    ⊢──────⊣ 60 MICRONS
FIGS. 9 THROUGH 63 APPEAR IN PATENT NO. 3,764,363

SURFACE TREATMENT OF MICROPOROUS MATERIAL

This application is a continuation of application Ser. No. 56,936 filed July 21, 1970, now U.S. Pat. No. 3,764,363 of Oct. 9, 1973. The entire disclosure (including drawings) of that application is incorporated herein by reference.

This application is also a continuation-in-part of applications Ser. Nos. 843,425 filed July 22, 1969 and 867,762 filed Oct. 20, 1969, which were copending with said application Ser. No. 56,936 and are now abandoned.

This invention relates to a process for finishing a sheet material having a microporous surface zone particularly suitable as a leather substitute for shoe uppers. A thin layer of a solution of polymer in a solvent which attacks the microporous surface zone is applied. But before that solution is applied, the surface zone is wet with a liquid which is a coagulant for that solution. The solution forms an adherent layer bridging and covering micropores which pass through the surface of the microporous zone. The adherent layer is less than 20 microns thick, is essentially free of pores whose diameter is above 0.3 micron, and is permeable to water vapor.

FIGS. 1 to 8 of this application correspond to FIGS. 1 to 8 in U.S. Pat. No. 3,764,363.

FIG. 1 is a cross sectional view of a microporous sheet, before treatment according to this invention; this particular sheet is of unsupported, fleeceless elastomeric (black pigmented) polyurethane and has two integral layers; the upper layer 11 is thinner than the lower layer 12 and has a lower specific gravity.

FIG. 2 is a cross sectional view, at a higher magnification than in FIG. 1, showing the upper surface zone of the sheet; upper surface is indicated at 13.

FIG. 3 is a view of the upper surface 13, which has a dull gray appearance and is characterized by a number of open micropores.

FIG. 4 is a view, at high magnification, of the central part of FIG. 3.

FIG. 5 is a cross sectional view of the upper surface zone of the sheet after it has been sprayed (while wet with a 50/50 methanol/water mixture) with a dilute pigmented solution of elastomeric polyurethane and dried. Comparison with FIG. 2 (which is to about the same scale) indicates the presence of a thin upper layer 14 in which there are very few pores of a size to be visible with the scanning electron microscope that is employed. In FIG. 5 the angle of viewing is such that one can see a portion of the upper surface 16, behind the plane of the cross section.

FIG. 6 is a view similar to FIG. 5 but at higher magnification.

FIGS. 7 and 8 are top views of the upper surface 16 of the material shown in FIG. 5 at different magnifications; they indicate that the surface is micropebbly, with few pores of the same size as in FIGS. 3 and 4, but is otherwise not as smooth as the original surface.

It is understood that the foregoing detailed description is given merely by way of illustration and that variations may be made therein without departing from the spirit of the invention.

We claim:

1. Process for the treatment of microporous material which consists essentially of providing a sheet material having a water vapor transmission of at least about 100 g/m$^2$/24 hrs. and having at least one surface zone of microporous polymeric material, said surface zone being wet with a liquid, applying to the outer surface of said surface zone a solution of polymeric material in a solvent which attacks the polymeric material of said surface zone, coagulating said solution by the action of said liquid present in said surface zone and removing said solvent and said liquid supplied by said surface zone by evaporation to form an adherent layer less than 20 microns in thickness on said surface zone, said liquid being a non-solvent for the polymeric material of said solution and of said surface zone and being a coagulant for said solution whereby to coagulate said solution as a water vapor permeable layer on said outer surface, there being sufficient of said non-solvent in said zone to effect said coagulation.

2. Process as in claim 1 in which said surface zone is of fiber-free microporous polyurethane having an apparent density of 0.3 to 0.4 g/cm$^3$.

3. Process as in claim 1 in which said surface zone is of fiber-free microporous polyurethane, said solvent is dimethylformamide, said liquid non-solvent is water, and said resulting water vapor permeable layer is essentially free of pores whose diameter is above 0.3 micron.

4. Process as in claim 3 in which said microporous polyurethane is present as a layer at least 0.2 mm thick.

5. Process as in claim 4 in which said layer thickness is 0.5 mm, the apparent density of said microporous layer is 0.3 to 0.4 g/cm$^3$, the polyurethane of said microporous layer is a thermoplastic elastomer having (in cast film form) a permanent set, after 100% elongation, of about 5 to 20%.

6. Process as in claim 1 in which said solution is carried on a solid transfer surface and is thereby applied to said microporous surface while the latter is wet with said non-solvent liquid.

7. Process as in claim 1 in which a layer of said solution is formed on said wet surface and said coagulation occurs primarily in that portion of said applied solution which is adjacent to said outer surface of said microporous zone, said coagulated layer after said coagulation and evaporation having a lustrous surface.

8. Process as in claim 3 in which said resulting water vapor permeable layer bridges and covers micropores which pass through said outer surface of said surface zone, and said solution of polymeric material contains dissolved elastomeric polyurethane.

9. Process as in claim 8 in which said solution contains a dispersed pigment, the ratio of dispersed pigment to polyurethane being in the range of about 1:1 to 1:10.

10. Process as in claim 9 in which said resulting water vapor permeable layer is 10 microns thick.

11. A process as in claim 9 in which said microporous surface zone has cavities, whose maximum dimensions are up to about 45 microns, connected by passages having smaller dimensions, the thickness of the walls of said cavities being in the range of about 1 to 10 microns.

12. A process as in claim 11 in which said adherent layer is about 2 to 10 microns thick.